Oct. 24, 1961
A. D. NOLAN
3,005,509
MOTOR VEHICLE FOR SUPPLYING POWER FOR MOVING
AIRPLANES ON THE GROUND
Filed Aug. 10, 1959
5 Sheets-Sheet 1
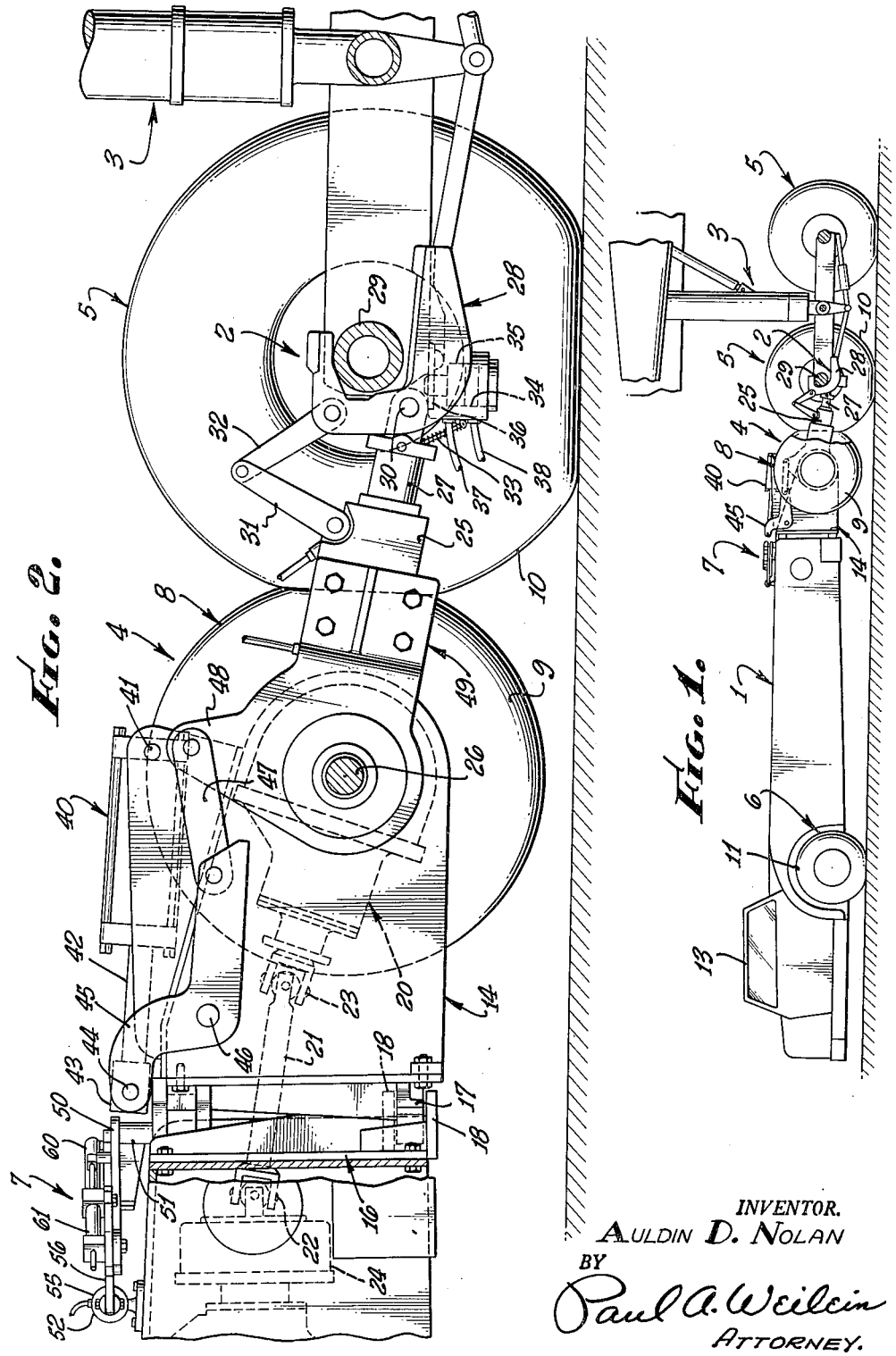
INVENTOR.
AULDIN D. NOLAN
BY
Paul A. Weilein
ATTORNEY.

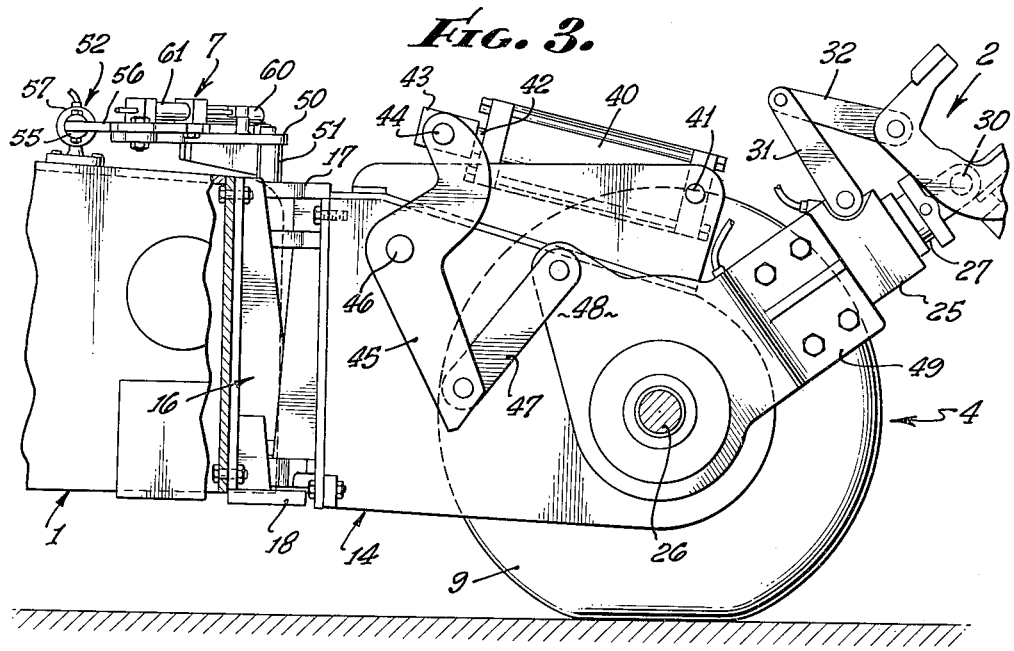
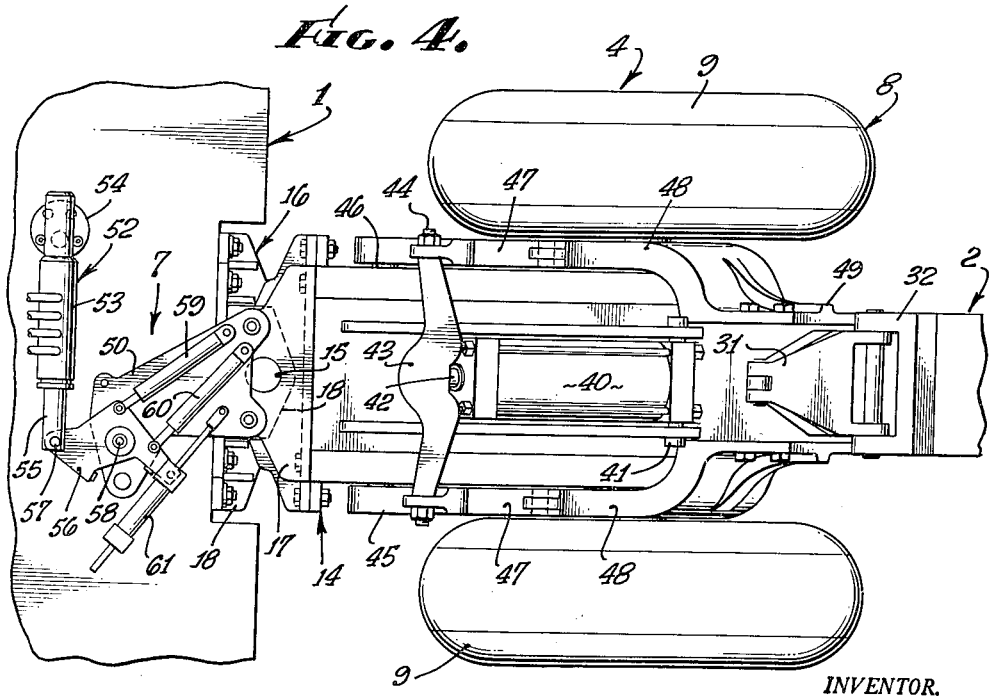

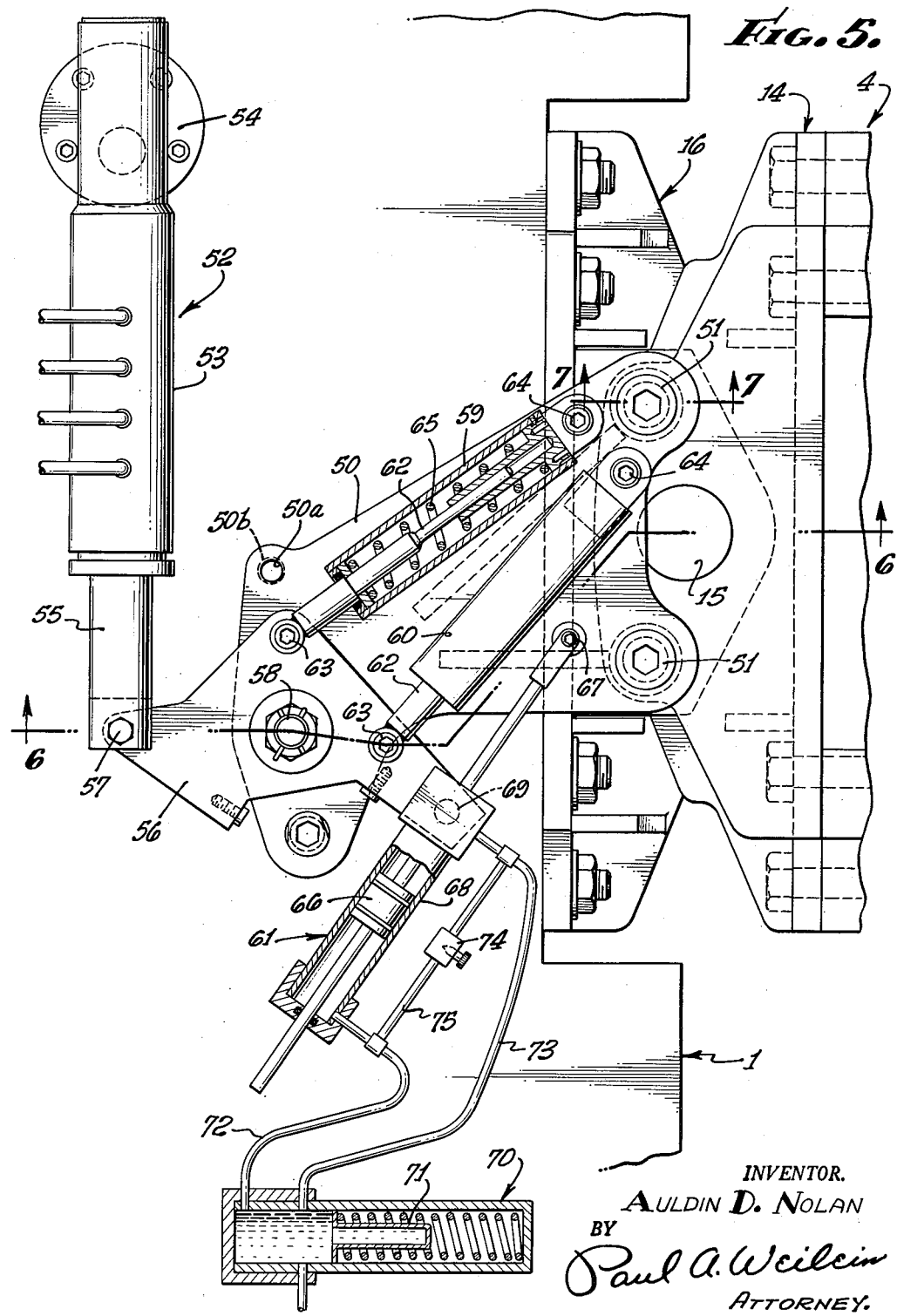

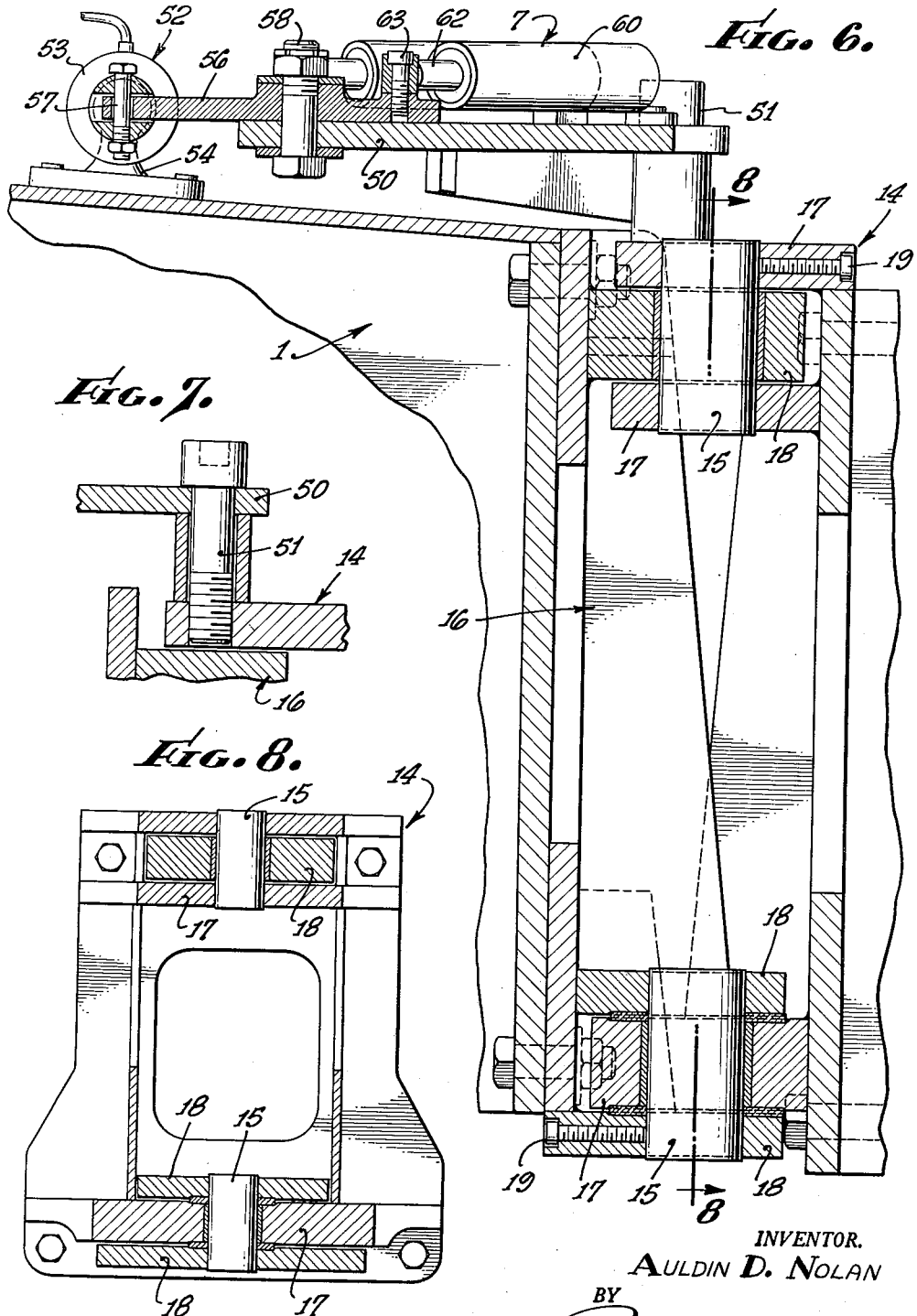

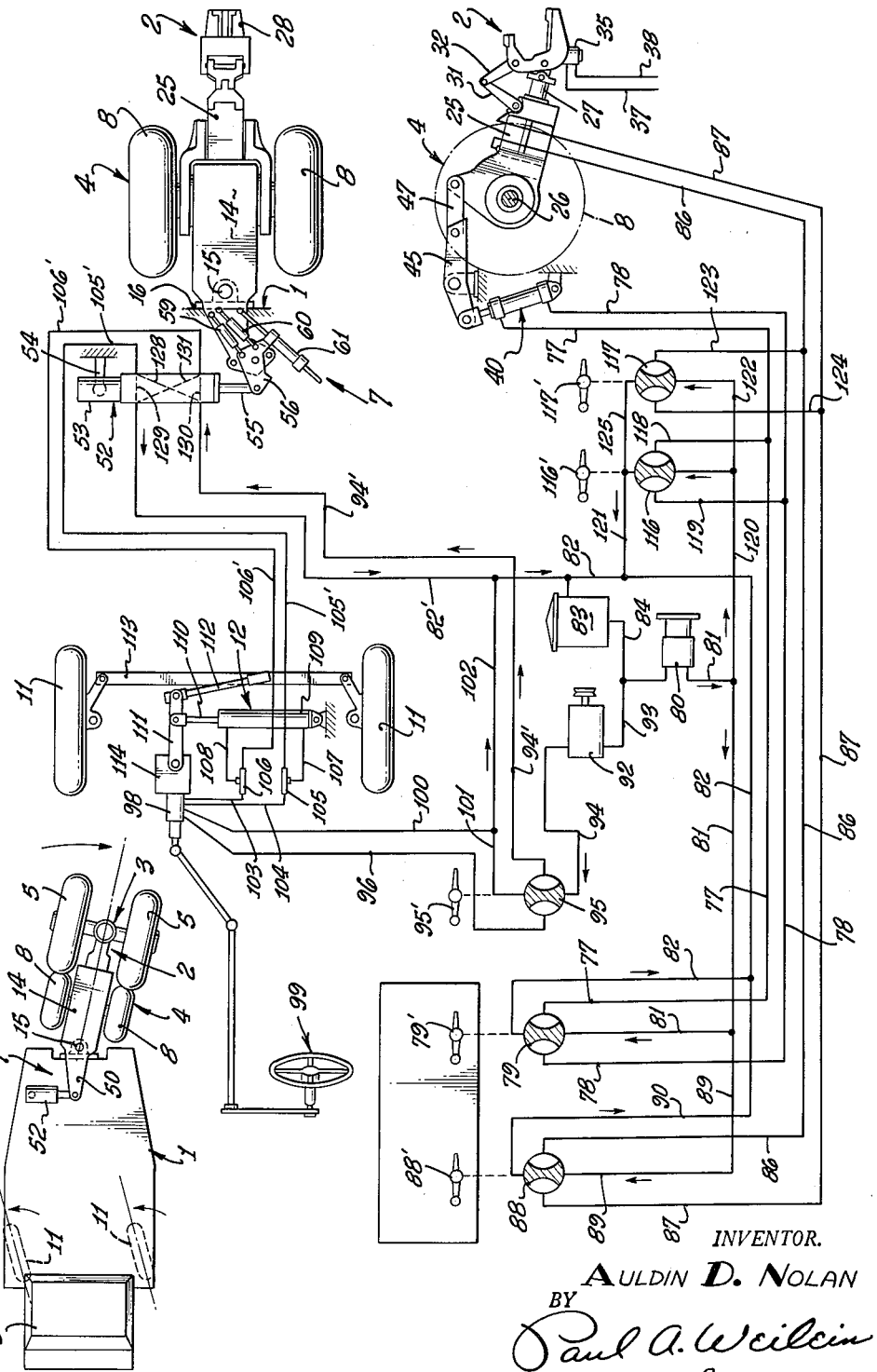

United States Patent Office 3,005,509
Patented Oct. 24, 1961

3,005,509
MOTOR VEHICLE FOR SUPPLYING POWER FOR MOVING AIRPLANES ON THE GROUND
Auldin D. Nolan, Palos Verdes, Calif., assignor to Air Logistics Corporation, Pasadena, Calif., a corporation of Delaware
Filed Aug. 10, 1959, Ser. No. 832,631
25 Claims. (Cl. 180—11)

This invention relates to improvements in motor vehicles for effecting ground movements of airplanes without requiring operation of engines of the airplanes.

It has been well established that there is a great need for a vehicle such as described which may be efficiently and economically operated to effect ground movement of airplanes, particularly large and heavy jet operated airplanes, in consideration of the numerous hazards, special blast walls or shields required at airports, objectionable noise, fuel consumption, engine wear and resultant comparatively great costs entailed in using jet engines for taxiing.

One motor vehicle that has been produced for the purpose above stated, is provided with power-driven ground wheels which may be elevated from the ground and forcibly held in frictional driving engagement with wheels of the landing gear of an airplane while one end of the vehicle is coupled to the landing gear and the other end of the vehicle is supported by steerable ground wheels. In the operation of this vehicle, the steering of the airplane optionally may be effected by the airplane pilot, and in most cases is pilot steered since it is desired that the pilot have full control of ground movement of the airplane. Accordingly, the motor vehicle, depending upon the manner in which it is coupled to the airplane and the direction of movement of the latter, will either be pushed ahead of or trail the airplane. This makes it desirable to maintain proper alignment and contact of the elevated wheels of the vehicle with the landing gear wheels in order to prevent an irregular frictional driving action and the imposition on the landing gear of undue loads which may prove damaging, particularly when the airplane negotiates turns.

It is also desired that the entire motor vehicle be maintained in alignment with the driven landing gear wheels, because failure of the vehicle to track freely and align with the driven landing gear wheels when the airplane makes a turn is likely to cause the vehicle to skid sidewise or tend to skid sidewise, and thereby possibly cause an irregular frictional driving action and impose a severe load on the landing gear.

In consideration of the desired operating characteristics of such vehicles hereinbefore expressed, it is the primary object of this invention to provide an improved motor vehicle for the purposes described, that efficiently, economically and safely may be operated to effect all necessary ground movements comparable to conventional taxiing of airplanes of various makes and sizes, including large and heavy jet operated airplanes, at speeds from inching up to 25 miles per hours and above and with assurance that the steering and operation of the airplane and the motor vehicle will be properly coordinated to achieve the aforementioned desired operating characteristics.

Another object of this invention is to provide a motor vehicle such as described that will achieve the foregoing objectives through the medium of novel means on the vehicle which responds to turning movements of the airplane in such a manner as will effect a steering of the motor vehicle and maintain it in the desired alignment with the landing gear wheels driven by the vehicle.

It is another object of this invention to provide an improved vehicle such as described wherein novel means will maintain the elevated power-operated wheels of the vehicle in proper alignment and frictional contact with the landing gear wheels at all times, regardless of turning and the direction of movement of the airplane or whether the motor vehicle is pushed ahead of or trails the airplane.

It is another object of this invention to provide a vehicle such as described wherein power-operated steering means of special arrangement and the elevated power-operated wheels which frictionally drive the landing gear wheels, are constructed and interrelated with one another and the body of the vehicle whereby in response to movements of the elevated wheels as effected by turning movement of the airplane, the steering means will operate to steer the ground wheels of the vehicle to position the vehicle in alignment with the driven landing gear wheels and thereby maintain the desired uniform frictional contact of the driving and driven wheels as well as prevent undue loading of the landing gear.

Another object of this invention is to provide in a motor vehicle such as described a novel means for mounting a pair of power operated ground wheels at one end of the vehicle so that they are movable as a unit about horizontal and vertical axes on the vehicle and are therefore articulate in a particular manner when elevated into frictional driving engagement with wheels of the landing gear. This makes it possible for these wheels to move to the right or left relative to the body of the vehicle in response to turning movement of the airplane, and thereby cause power-operated steering means for the ground-engaging wheels at the other end of the vehicle to steer the vehicle so that it will maintain proper alignment with the driven wheels of the landing gear at all times.

Another object hereof is to provide a motor vehicle for supplying power for moving an airplane on the ground, wherein the vehicle includes a novel arrangement of a vehicle body, steerable wheel means, means for coupling the vehicle to the airplane for movement therewith on the ground, means including a power source on the body operable for driving wheels of the landing gear of the aircraft; means providing an axis about which the driving means is movable in response to turning movements of the airplane; and steering means operable in response to movement of the driving means about said axis to steer the steerable wheel means to maintain the vehicle in predetermined alignment with the driven landing gear wheels.

A further object of this invention is to provide a motor vehicle which makes it possible to achieve the objectives hereinbefore noted through the medium of a novel arrangement and interrelation of a vehicle body, power driven wheels, steerable wheels, means for coupling the vehicle to the landing gear of an airplane for movement therewith on the ground, means for moving the power driven wheels off the ground into driving engagement with wheels of the landing gear, means providing an axis about which the power-driven wheels are movable in response to turning movement of the airplane, and steering means operable in response to turning movement of the power-driven wheels about said axis to steer said steerable wheels.

Other objects and advantages of the invention will be hereinafter described or will become apparent to those skilled in the art, and the novel features of the invention will be defined in the appended claims.

Referring to the drawings:

FIG. 1 is a schematic fragmentary side elevational view of a motor vehicle embodying the present invention as it would appear when coupled to the landing gear of an aircraft and operated to drive wheels of the landing gear for moving the aircraft along the ground;

FIG. 2 is an enlarged fragmentary longitudinal sectional view of the driving unit of the motor vehicle and a part of the landing gear of an airplane, when coupled in driving relation, as shown in FIG. 1;

FIG. 3 is a fragmentary longitudinal sectional view of the driving unit of the motor vehicle with the driving wheels on the ground and the coupling means uncoupled from the landing gear of an airplane;

FIG. 4 is a fragmentary top plan view of the driving unit shown in FIG. 3;

FIG. 5 is an enlarged fragmentary top plan view of the pivotally mounted driving means shown in FIG. 3 and 4, showing partly in section and in plan the special form of steering means operable responsive to pivotal movement of the driving means;

FIG. 6 is an enlarged fragmentary sectional view taken substantially on the line 6—6 of FIG. 5;

FIG. 7 is a fragmentary sectional view taken substantially on the line 7—7 of FIG. 5;

FIG. 8 is a sectional view taken on the line 8—8 of FIG. 6, on a reduced scale;

FIG. 9 is a schematic view showing hydraulic circuits and hydraulically operated units of the motor vehicle and controls for such units; and FIG. 10 is a schematic view on a reduced scale showing how the motor vehicle will be steered in response to turning movement of the aircraft driven thereby, to bring the vehicle into alignment with the driven wheels of the landing gear.

With reference to the accompanying drawings it will be seen that a motor vehicle embodying the present invention generally includes a vehicle body 1, coupling means 2 for operatively connecting the vehicle to an aircraft, as here shown through the landing gear 3, driving means 4 operable on one end of the body for driving wheels 5 of the landing gear, steerable wheel means 6 on the other end of the body and a special form of steering means 7 operably connected with the driving means 4 and the steerable wheel means 6 for steering the latter in response to relative movements of the driving means 4 and body 1.

The driving means 4 and the special form of steering means 7 are constructed and interrelated so that while the vehicle is operated to drive an airplane, the turning of the airplane by the pilot to the right or left will cause the driving means 4 to move in such a manner that the steering means 7 will steer the vehicle to maintain it in proper alignment with the driven landing gear wheels 5.

As here shown, the driving means 4 includes a pair of power driven wheels 8 having pneumatic tires 9 thereon. When on the ground these wheels are operable to propel the vehicle in the conventional manner. However, when the vehicle is coupled to an airplane by means of the coupling means 2, the wheels 8 may be elevated from the ground and moved so that the tires 9 thereon will frictitionally engage tires 10 on the landing gear wheels 5 for driving the latter and thereby moving the airplane.

The steerable wheel means 6, as here shown, includes a pair of conventional steerable wheels 11 mounted in the conventional manner and subject to being steered by conventional power-operated, manually-controllable steering means 12 schematically shown in FIG. 9. Manual control of the steering means 12 may be effected independently of the special form of steering means 7 actuated by the driving means 4.

When the vehicle is coupled at one end to the airplane and the driving wheels 8 are elevated from the ground, the steerable wheels 11 support the other end of the vehicle and are subject to being steered by the steering means 7 or the conventional manually-controlled steering means 12, which latter is operable from the cab 13 of the vehicle.

One or more suitable internal combustion engines may be employed as the power source for operating all other components of the vehicle, including the driving wheels 8. It is thought, however, that it is unnecessary to illustrate other than as shown in the accompanying drawings, the power means and related vehicle components embodied in the motor vehicle, since it is within the knowledge of those skilled in this art as to how the vehicle may be equipped with power steering means, brakes and all other controls and components such as presently used in motor vehicles including trucks and the like, with provision for controlling such components from the vehicle cab 13. However, certain controls essential to this invention are schematically shown in FIG. 9, and will be hereinafter fully described.

The driving means 4 includes, as here shown, a frame structure 14 which in effect is an articulate extension of one end of the vehicle body 1, being pivotally connected thereto for limited swinging movement about a vertical axis formed by a pair of axially spaced and aligned king pin sections 15, as shown in FIGS. 2–8. The frame structure 14 and the adjacent end 16 of the vehicle body 1 as shown in FIGS. 6 and 8, have interfitted bearing lugs 17 and 18 rigidly joined thereto and in which the king pin sections 15 are mounted and so held by set screws 19 in a manner pivotally mounting the frame structure 14, whereby the body 1 and the frame 14 are relatively movable about the axis of the king pin sections.

The driving wheels 8, as shown in FIGS. 2, 3 and 4, are disposed on opposite sides of the frame 14, being mounted on and driven by an axle unit 20 carried by the frame. This axle unit may be of any locked differential type or similar type suitable for correspondingly driving the wheels 8 in either direction.

Power for driving the axle unit 20 to drive the wheels 8 is supplied through a flexible drive shaft 21 having universal joint connections 22 and 23 with the power source power take-off unit 24 (see FIG. 2) and the axle unit 20 respectively, the take-off unit 24 and shaft 21 being operable for driving the wheels 8 in either direction.

The coupling means 2 includes a hydraulic cylinder 25, hereinafter referred to as the crowding cylinder, mounted on the axle 26 of the axle unit 20 to swing upwardly and downwardly. A piston 27 is operable in the crowding cylinder 25 and projects therefrom for supporting a coupling head 28 which provides for detachably connecting the motor vehicle with the axle 29 of the landing gear 3 at a point on the axle between the landing gear wheels 5 which are to be driven by the vehicle wheels 8. As here shown, the head 28 is U-shaped and pivoted as at 30 on the outer end of the piston 27 so that it may be appropriately moved to embrace the landing gear axle 29.

In order that the coupling head 28 will be disposed in position to embrace the landing gear axle 29 when the motor vehicle is moved toward the landing gear 3, a pair of links 31 and 32 are pivoted to one another and the cylinder 26 and head 28, respectively, and extend thereabove so that together with spring means 33 depending from the piston and connected with the lower portion of the head 28, the latter will be maintained in proper position for coupling to the axle 29 when in alignment therewith. In this connection, it should be noted that the coupling head 28 may be removed from the piston 27 whereby a coupling head suited to an airplane having a different construction of its landing gear than here shown may be substituted.

Any suitable means may be employed in the coupling head 28 for releasably locking it to the landing gear axle 29 whereby a reliable draft connection will be established between the motor vehicle and the airplane during the driving of the airplane by means of the motor vehicle. This locking means may be manually locked and released, or as here shown, hydraulically operated whereby it may be controlled from the cab 13 of the motor vehicle. Accordingly, a small hydraulic cylinder 34, having therein a piston 35 which serves as a locking pin, is mounted on the coupling head 28 so that the piston-locking pin 35 may be moved into and from locking engagement with an apertured locking lug 36 provided on the landing gear axle 29. Hydraulic hose lines 37 and 38 lead from the cylinder 34 to a power source and a control valve which latter is not shown but may be located in the cab 13 of the vehicle. It is thought to be unnecessary to illustrate this control valve for the locking cylinder 34 since it will be obvious to persons skilled in the automotive art how this control may be effected.

Power-operated positioning means are provided for moving the crowding cylinder 25 about the axle 26, whereby the coupling head 28 may be disposed at the proper level for effecting connection thereof with the landing gear axle 29. The positioning means is also operated to lift the coupled end of the vehicle, whereby the wheels 8 may be moved into frictional driving engagement with the landing gear wheels. As shown in FIGS. 2, 3 and 4, this positioning means includes a hydraulic positioning cylinder 40 pivoted at one end as at 41 on the upper central part of the frame 14, with the other end free from limited vertical movement. A piston 42 is operable in the cylinder 40 and projects rearwardly therefrom for supporting on its outer end a rigid yoke 43. The outer ends of the yoke 43 are pivoted as at 44 to the upper ends of rocker arms 45 fulcrumed as at 46 on opposite sides of the frame 14. The other ends of the rocker arms 45 are pivotally connected to links 47 in turn pivotally connected to crank arms 48 projecting from opposite sides of the mounting structure 49 for the crowding cylinder 25. With this arrangement, when the piston 42 of the positioning cylinder 40 is extended, the rocker arms 45, links 47 and crank arms 48 are moved so as to swing the crowding cylinder 25 and coupling head 28 downwardly. Retraction of the positioning cylinder piston 42 will cause the crowding cylinder 25 and coupling head 28 to be raised. When the coupling head is coupled to the landing gear the retraction movement of the piston 42 will lift the coupled end of the vehicle and raise the wheels 8 from the ground.

It will now be apparent that the driving means 4 of the motor vehicle embodying the present invention which, as here shown, may be considered as including the frame 14, the driving wheels 8, the crowding cylinder 25, the coupling head 28, and the positioning cylinder 40 and associated parts, constitutes an articulate unit so connected with the vehicle body 1, that limited relative movement of this unit and the vehicle body may take place about the vertical axis provided by the king pin unit 15. It is by reason of this movement of this driving unit that provision is made for the desired steering of the motor vehicle in response to turning movement of the aircraft to thereby maintain the vehicle in proper alignment with the wheels of the landing gear driven by the wheels 8 of the vehicle. This steering of the motor vehicle assures an uninterrupted and steady driving action free from the transmission of undue and possibly damaging loads to the landing gear as well as to the driving unit of the motor vehicle.

The special form of power steering means 7 provided on the motor vehicle for steering the steerable wheels 11 is arranged to operate in response to limited swinging movement of the entire drive unit 4 including the frame 14, about a vertical axis as effected by the forces applied to the driving wheels 8 by the landing gear wheels 5 upon the turning of the airplane. Accordingly, it is necessary that forces derived from such swinging movement be transmitted to the power steering means 7. For this purpose a plate-like arm 50 is rigidly fixed to the upper rear part of the frame 14 by suitable fastening means 51 so as to extend rearwardly over the upper side of the vehicle body 1 and to swing to the right or left with swinging movement of the frame 14.

Movement of the arm 50 is depended upon to operate a valve 52 of the power steering means 7 for controlling the operation of the power steering unit 12, shown in FIG. 9, whereby the steerable wheels 11 will be steered appropriately to maintain alignment of the motor vehicle with the driven wheels of the airplane. The valve 52 includes a housing 53 fixed as at 54 at one end on the vehicle body 1 and provided with a valve member 55 which is reciprocable in the housing 53 to control flow of hydraulic fluid for operating the power steering means 12, in a manner which will be hereinafter fully described.

The valve 52 may be of any suitable type which, in response to relative movement of the vehicle body 1 and the driving means 4 about the axis of the king pin unit 5, instantly will cause the vehicle to be steered into alignment with the driving wheels 8 and the landing gear wheels 5. As here shown, schematically, this valve is known to the trade as a Garrison control valve that is hydraulically operated in response to but slight mechanically effected reciprocable movement of a reciprocable member which, in this instance, is the valve member 55. But slight movement of the member 55 in one direction causes a predetermined directional flow of fluid under pressure from the valve and an equally slight movement of the member 55 in the opposite direction cause another predetermined direction flow. It is believed to be unnecessary to here show the construction of this valve as it is well known to those skilled in the automotive art both as to its construction and mode of operation, the valve in effect being a mechanically-controlled fluid-pressure operated 4-way valve.

Control of the operation of the valve 52 is effected by means of a bell crank 56 pivoted as at 57 to the valve member 55 and as at 58 on the plate-like arm 50 extending from the frame 14. Since but a small amount of reciprocable movement of the valve member 55 is required to control the steering action, lost-mostion means are provided to control the rocking movement of the bell crank 56. As here shown, this means includes a pair of spring-loaded cylinders 59 and 60 and a dash pot unit 61. Each of the cylinders 59 and 60 as shown in FIG. 5, includes a plunger rod 62 pivoted at 63 on the bell crank 56 and slidably extended into its associated cylinder which latter is pivoted as at 64 on the plate-like arm 50. A spring 65 is arranged in the cylinders so as to exert a force urging the rod 62 and the cylinder in opposite directions. Accordingly, cylinders 59 and 60 are positioned so that the springs therein will exert a force normally holding the bell crank 56 in a predetermined neutral position such that the valve member 55 is yieldably held in a neutral position whereby the valve 52 is rendered inoperable to effect a steering operation until a predetermined movement of the frame 14 and valve member 52 takes place. Any relative swinging movement of the frame 14 and the vehicle body will cause the arm 50 and the bell crank 56 which latter is connected to the valve 52 fixed on the vehicle body to move relative to the valve 52 against the action of the springs 65 in the cylinders, thereby providing a lost-motion movement of the bell crank for operating the valve member 55. Further lost-motion control of the movement of the bell crank 56 is effected by the dash pot unit 61 being arranged so that the piston 66 thereof is pivoted as at 67 to the arm 50 while the cylinder 68 is pivoted as at 69 to the bell crank 56. The arrangement of the dash pot 61 is such that it retards the movement of the bell crank 56 and movement of the valve member 55.

The dash pot 61 may be of any suitable form provided it will control the movement of the bell crank 56 as hereinbefore noted. As schematically shown in FIG. 5, the dash pot cylinder 68 is supplied with hydraulic fluid from an accumulator 70 operated by a spring loaded piston 71 and connected through the conduits or ducts 72 and 73 with opposite ends of the cylinder. An adjustable flow restricting valve 74 is mounted in a conduit or duct 75 coupled to the ducts 72 and 73, whereby movement of the dash pot piston 66 in either direction will displace the fluid from one end of the cylinder through the duct 75 past the valve 74 back to the other end of the cylinder thereby restricting and controlling movement of the bell crank 56 as required properly to actuate the steering valve 52. Adjustment of the valve 74 makes it possible to vary the rate of movement of the dash pot piston 66 and restraining action of the dash pot unit 61 best to cause the desired steering action of the valve 52.

FIG. 9 schematically illustrates the hydraulic circuits and control valves for actuating the crowding cylinder 25, the positioning cylinder 40, the steering or sensing valve 52 of the special form of steering means 7, and the conventional power steering unit 12 of the motor vehicle.

The hydraulic circuit for the positioning cylinder 40, as indicated in FIG. 9, includes hose lines 77 and 78 leading from opposite ends of that cylinder and a control valve 79 that is preferably mounted in the cab 13 of the motor vehicle and operable by means of the handle 79'. From a pump 80 operated by the power plant (not shown) of the motor vehicle, a pressure line 81 leads to the valve 79 and from the latter a return line 82 leads to a reservoir tank 83. Fluid from the tank 83 is supplied to the pump 80 through a line 84. With this arrangement it will be seen that the valve 79 may be operated from the cab 13 at will to actuate the positioning cylinder 40 for either raising or lowering the coupling means 2 whereby the coupling head 28 may be coupled to the axle 29 of the landing gear 3. When coupled to the landing gear, the coupling head 28 is releasably locked thereto by any suitable means or the means here shown including the hydraulically actuated piston-locking pin 35 hereinbefore described. Following this coupling of the motor vehicle to the landing gear, the positioning cylinder 40 is operated to raise the end of the vehicle coupled to the landing gear so as to elevate the driving wheels 8 from the ground into a position such that the crowding cylinder 25 may be operated to move the wheels 8 into frictional driving engagement with the landing gear wheels 5. In raising the coupled end of the vehicle, the vehicle body fulcrums about the axis of the wheels 11.

The hydraulic circuit for the crowding cylinder 25, as shown in FIG. 9, includes hose lines 86 and 87 leading from opposite ends of this cylinder to the control valve 88 located in the cab 13 of the motor vehicle and operated by the handle 88'. A pressure line 89 leads from the pressure line 81 connected with the pump 80, to the valve 88, and from this valve a return line 90 leads to the return line 82 connected with reservoir tank 83. With this arrangement it will be apparent that the valve 88 may be operated as required to actuate the crowding cylinder 25 for extending and retracting the crowding cylinder piston 27 and the coupling head 28 for urging the wheels 8 under pressure into frictional driving engagement with the landing gear wheels.

The hydraulic circuit, as indicated in FIG. 9, for the power steering unit 12 and special form of steering means 7 includes a pump 92 driven by the power plant (not shown) of the motor vehicle and connected with the reservoir 83 by means of the line 93 and the line 84. A pressure line 94 leads from the pump 92 to a control valve 95 operated by a handle 95' and which may be positioned in the vehicle cab 13. From the valve 95 a line 96 leads to the conventional steering valve 98 actuated by the steering wheel unit 99. From the steering valve 98 a return line 100 leads through its branches 101 and 102 to the valve 95 to the reservoir 83, respectively. The circuit controlled by the valve 95 as described up to this point provides for actuation of the conventional steering unit 12 upon manipulation of the steering wheel unit 99 when the valve 95 is in one of its operative positions wherein pressure fluid flows therefrom through pressure line 96 to the steering wheel actuated steering valve 98. The valve 98 is connected by lines 103 and 104 with shuttle valves 105 and 106 from which latter lines 107 and 108 lead to opposite ends of the power cylinder 109 of the conventional power steering unit 12. When one of the shuttle valves 105 or 106 is actuated in response to operation of the valve 95, the power cylinder 109 will operate through the piston 110, then the conventional pitman arm 111, drag link 112 and the steering rod 113 to steer the wheels 11, the return fluid from the cylinder 109 passing through the other shuttle valve, the valve 98 and into return line 100. In this connection it should be noted that the pitman arm 111 may be mechanically operated through the gear box 114 responsive to operation of the steering wheel unit 99, as is customary in conventional power steering units.

The valve 95 also makes it possible to render the special form of steering means 7, that is, the sensing valve 52, operative and inoperative at will. Accordingly, a pressure line 94' leads from the valve 95 to the valve 52 while a return line 82' leads from the valve 52 to the return line 102, thence to the reservoir 83. From the valve 52, lines 105' and 106' lead to the shuttle valves 105 and 106, respectively. The manner in which the valve 52 controls the steering of the wheels 11 will be hereinafter fully described in connection with the operation of the motor vehicle of this invention.

Provision is made for operating the positioning cylinder 40 and the crowding cylinder 25, for example adjacent the end of the vehicle body 1 that is to be coupled to an airplane, whereby an attendant at that point may effect the coupling of the head 28 to the landing gear and the movement of the wheels 8 into driving engagement with landing gear wheels, instead of relying upon the driver of the vehicle in the cab 13 to operate the positioning and crowding cylinders. For this purpose valves 116 and 117 for controlling operation of the positioning cylinder 40 and the crowding cylinder 25, respectively, are provided as shown in FIG. 9, it being thought unnecessary to show these valves in the other views of the drawings since they may be located at any point subject to convenient operation by an attendant adjacent the end of the motor vehicle to be coupled to the airplane. The valve 116 for the positioning cylinder 40, as shown in FIG. 9, is coupled to the fluid lines 77 and 78, for the cylinder 40 by means of lines 118 and 119, and is operable by means of the handle 116'. A pressure line 120 leads from pressure line 81 to the valve 116, while a return line 121 leads from the valve 116 to the return line 82.

The valve 117 for the crowding cylinder is operated by the handle 117' and is supplied with fluid under pressure from the pressure line 120 by means of the line 122, and is connected by lines 123 and 124 with the lines 86 and 87 leading to the crowding cylinder 25. A return line 125 leads from the valve 117 to the return line 121.

When the airplane to which the motor vehicle is coupled in driving relation in accordance with this invention is turned to the right or left by the pilot of the aircraft, relative movement of the driving unit 4 and body 1 of the vehicle will take place about the axis of the king pin unit 15, inasmuch as the landing gear wheels 5 will transmit a force to the driving wheels 8 to cause such relative movement.

When the vehicle is to be steered in response to turning movement of the aircraft, the control valve 95 is set so that fluid under pressure will flow therefrom through the line 94' to the sensing valve 52. If at this time the airplane is steered, for example to the right as indicated by the arrow in FIG. 10, the driven wheels 5 of the landing gear 3 will transmit a force through the driving wheels 8 effective to swing the frame 14 and wheels 8 to the right relative to the vehicle body 1 about the axis of the king pin 15. This movement of the frame 14 through the arm 50 (see FIG. 5) and crank arm 56 on the arm 50 causes the valve member 55 of the sensing valve 52 to be moved for supplying fluid for steering the wheels 11. In the example shown schematically in FIG. 10, movement of the frame 14 to the right causes the arm 50 on the frame 14 to swing to the left, that is, toward the valve 52 as will be apparent with reference to FIG. 5, the arm moving with it the bell crank 56. As one end of the valve member 55 is pivoted at 57 to an end of the bell crank 56 and the latter moves bodily with the arm 50 toward the valve 52, it is apparent that the end of the bell crank 56 connected to the valve member 55 tends to move to the right, that is, away from the valve 52 as the bell crank tends to move angularly about the axis of the pivot 58. At this time the spring 65 in the spring loaded cylinder 59 resists such angular movement of the bell crank as also does the dash pot unit 61, with the result that due to the angular movement of the bell crank 56 about its axis, there will be appreciable lost motion between the arm 50 and the valve member 55, such that the latter is moved but slightly to a position in which the valve 52 operates to move the wheels 11 to the left as shown in FIG. 10, thereby steering the motor vehicle to align the body 1 with the driving wheels 8 and the driven landing gear wheels 5.

In effecting this steering operation, the valve member 55 upon being slightly inwardly moved relative to the valve housing 53 in response to the force applied thereto by the bell crank 56, causes the valve elements (not shown) in the valve cylinder 53 to be hydraulically moved by the pressure fluid from the line 94', to a position such that the duct 128 in the valve housing 53 will direct fluid under pressure into the line 105' leading to the shuttle valve 105 which latter then directs the fluid through line 107 to operate the power cylinder 109. The cylinder 109 operates at this time to extend the piston 110, and through the pitman arm 111, drag link 112 and steering rod 113, will move the wheels 11 as shown in FIG. 10, to steer the vehicle body 1 into alignment with the driving wheels 8.

During this steering operation return fluid from the power cylinder 109 passes through line 108, shuttle valve 106, line 104, valve 98 and return lines 100 and 102 to the reservoir 83. Return fluid from the pressure operated valve 52 passes through valve duct 129 into the return line 82' thence to the reservoir 83.

As the vehicle body 1 swings to the left into alignment with the driving wheels 8, relative movement of the valve cylinder 53 and the valve member 55 takes place in such a manner that the valve 52 is again fluid pressure operated to cause reversal of flow of pressure fluid whereby the pressure fluid will pass from line 94' through valve duct 130, into line 106' and thereby operate the shuttle valve 106 to retract the piston 110 and through the pitman arm 111, drag link 112 and steering rod 113 turn the wheels 11 so as to straighten them at the time of alignment of the vehicle body 1 with the wheels 8. When the valve 52 reverses flow as above noted, return fluid therefrom passes through the valve duct 131 into return line 82' leading to the reservoir tank 83. This reversing action of the valve 52 is brought about in that when the vehicle body swings to the left into alignment with the driving wheels 8 and driven landing gear wheels 5, the valve cylinder 53 moves with the vehicle body while the valve member 52 is held against such movement by reason of its connection with the bell crank 56, the latter also resisting movement to the left as well as angular movement about its axis by reason of the action of the spring loaded cylinder 60 and the dash pot unit 61. With this arrangement it will be seen that the valve 52 senses the movement of the arm 50 and bell crank 56 in such a manner that the wheels 11 will be steered to maintain the vehicle in proper alignment with the driving wheels 8 and driven landing gear wheels, without requiring steering of the motor vehicle from the cab 13 thereof.

The driving unit 4 including the frame 14, drive wheels 8, the other operating elements on this frame, constitutes in effect an articulate driving truck as a part of the vehicle and which in cooperation with the automatic steering means 7 make possible the efficient use of the motor vehicle for the purposes herein noted.

In some instances, for example in towing certain types of airplanes with all wheels of the motor vehicle on the ground, also while the vehicle is being driven apart from an aircraft, the frame 14 should be locked against movement relative to the vehicle body 1 so as to render the automatic steering means 7 inoperable. Any suitable means may be used for this purpose and as here shown, this locking action may be accomplished by removably positioning in registering holes 50a and 50b in the frame member 50 and the vehicle body 1, respectively, a locking pin (not shown) or a similar element that will prevent relative movement of the vehicle body 1 and the frame 14 about the axis of the king pin unit 15.

With reference to the foregoing description and the accompanying drawings, it will be apparent that a motor vehicle embodying the present invention readily may be run under the larger types of airplanes for connection to the front or rear side of landing gear of the airplane for the purpose of driving wheels of the landing gear and thereby moving the aircraft as desired along the ground without necessitating operation of the airplane engine.

An important feature of this invention is the provision for steering of both the airplane and the power supplying vehicle by the airplane pilot. Moreover, the vehicle readily lends itself to being controlled as to speed and braking by the airplane pilot, as it is well within the knowledge of those skilled in the art of remote control means for automative purposes to provide adequate control means between the airplane cabin and the motor vehicle that will enable the pilot to control the speed and braking action of the motor vehicle.

While specific structural details have been shown and described, it should be understood that changes and alterations may be resorted to without departing from the spirit of the invention as defined in the appended claims.

I claim:

1. A motor vehicle for supplying power for moving an aircraft on the ground including: a vehicle body; steering means on said body; means for coupling the vehicle with an airplane for movement therewith on the ground; means including a power source on said body for driving wheels of the landing gear of the airplane to propel the airplane on the ground; means mounting said driving means for movement about an axis in response to turning movement of the airplane while the airplane is being driven by said driving means; and means operable in response to movement of said driving means about said axis for operating said steering means to maintain the vehicle in alignment with said landing gear wheels.

2. A motor vehicle for moving an airplane on the ground including: a vehicle body; power driven wheels on said body; steerable wheels on said body; means for coupling the vehicle to an airplane for movement therewith on the ground; means for moving said power driven wheels into driving engagement with wheels of the landing gear of said airplane; means mounting said power driven wheels for movement about an axis in response to turning movements of the airplane; and steering means operable in response to movement of said power driven wheels about said axis to steer said steerable wheels.

3. A motor vehicle for moving an airplane on the ground including: a vehicle body; power driven wheels on said body; steerable wheels on said body; means for coupling the vehicle to an airplane for movement therewith on the ground; means cooperable with said coupling means for crowding said power driven wheels into frictional driving engagement with wheels of the landing gear of said airplane; means mounting said power driven wheels for swinging movement relative to said vehicle body in response to turning movements of the airplane; and steering means operable in response to said swinging movement of said power driven wheels about said axis to steer said steerable wheels.

4. A motor vehicle for moving an airplane on the ground including: a vehicle body; power driven wheel means on said body; steerable wheel means on said body; means for coupling the vehicle to the landing gear of an airplane for movement therewith on the ground; means for moving said power driven wheel means off the ground into frictional driving engagement with wheel means of the landing gear of said airplane; means mounting said power wheel means for movement about a vertical axis on said body in response to turning movements of the airplane; and steering means operable in response to movement of said power driven wheel means about said axis to steer said steerable wheel means so as to maintain the vehicle in alignment with said driven wheel means of said landing gear.

5. A motor vehicle for moving an airplane on the ground including: a vehicle body; power driven wheels; means for coupling said vehicle with an airplane for movement therewith on the ground; means operable while said coupling means is coupled to the airplane for moving said power driven wheels off the ground into frictional driving engagement with wheels of the landing gear of the airplane; means for crowding said power driven wheels under pressure against said landing gear wheels; steerable wheels movable on said body for steering the vehicle; means mounting said power driven wheels for movement about an axis relative to said body in response to turning movement of the airplane; and steering means operable in response to movement of said power driven wheels about said axis for moving said steerable wheels to maintain the vehicle in alignment with said driven wheels of said landing gear.

6. A motor vehicle for moving an airplane on the ground including: a vehicle body; means for coupling said body to landing gear of an airplane for movement with the airplane on the ground; power-operated wheels; means affording movement of said power-operated wheels between ground engaging position and a position above the ground while said coupling means is connected to said landing gear; means for moving said power-operated wheels between said positions; means for crowding said power-operated wheels while elevated from the ground into pressurized frictional driving contact with wheels of the landing gear of the airplane; means mounting said power-operated wheels for movement about a vertical axis relative to said body while in said frictional driving contact with said landing gear wheels; turning of the aircraft causing said landing gear wheels to move said power-operated wheels about said axis; steerable wheel means supporting said body; power-operated steering means for said steerable wheel means; and sensing means operatively connected with said power-operated steering means and said means for mounting said power-operated wheels for movement about said axis, operable to actuate said steering means for steering said steerable wheel means according to the direction of movement of said power-operated wheels about said axis.

7. A motor vehicle for moving an airplane on the ground including: a vehicle body; steerable wheel means at one end of said body; a frame; means connecting said frame with said body providing for relative movement between said frame and said body about a vertical axis; driving wheels mounted on said frame; power-operated driving means on said body; means providing a driving connection between said driving means and said driving wheels; means connected with said frame for coupling the vehicle to the airplane for movement therewith on the ground; means operable while said coupling means couples the vehicle to the airplane for moving said driving wheels between a ground engaging position and a position elevated from the ground; means operatively connected with said coupling means for urging said driving wheels while elevated, into frictional driving engagement with wheels of the landing gear of said airplane; said frame being movable about said axis and relative to said body in response to forces directed by said landing gear wheels against said driving wheels upon the turning of the airplane to the right or left; means on said body for steering said steerable wheel means; and sensing means connected with said frame and said steering means for actuating said steering means to steer said steerable wheel means according to the direction of movement of said frame about said axis.

8. A motor vehicle for moving an airplane on the ground including: a vehicle body; steerable wheels on one end of said body for rotation about a horizontal axis; a frame; means mounting said frame on the other end of said body for relative movement of the frame and body about a vertical axis; driving wheels carried by said frame; driving means on said body; a flexible drive connection between said driving wheels and said driving means; coupling means on said frame for coupling the frame to the landing gear of an aircraft; means operable while said frame is coupled to said landing gear for moving said driving wheels off the ground; said body and frame pivoting about said horizontal axis of said steerable wheels upon said movement of said driving wheels off the ground; crowding means connected with said frame and said coupling means operable to urge said driving wheels into frictional driving engagement with wheels of said landing gear; said landing gear wheels upon the turning of the airplane to the right or left applying to said driving wheels a force for moving said frame about said vertical axis; and steering means operatively connected with said body, said frame and said steerable wheels, operable in response to said movement of said frame about said vertical axis to steer said steerable wheels for aligning said frame and said body with one another as well as with said wheels of said landing gear.

9. A motor vehicle for moving an airplane on the ground including: a vehicle body; steerable wheels on one end of said body for rotation about a horizontal axis; a frame; means mounting said frame on the other end of said body for relative movement of the frame and body about a vertical axis; driving wheels carried by said frame; driving means on said body; a flexible drive connection between said driving wheels and said driving means; coupling means on said frame for coupling the frame to the landing gear of an aircraft; means on said frame operable while said coupling means couples said frame to said landing gear for moving said driving wheels off the ground; said body and frame pivoting about the horizontal axis of said steerable wheels upon movement of said driving wheels off the ground; crowding means connected with said frame and said coupling means operable to urge said driving wheels into frictional driving engagement with wheels of said landing gear; said landing gear wheels upon the turning of the airplane to the right or left applying to said driving wheels a force for moving said frame about said vertical axis; power-operated steering means on said body connected with said steerable wheels; and sensing means operatively connected with said frame and said power-operated steering means operable in response to said relative movement of said frame and said body about said vertical axis to actuate said steering means to steer said steerable wheels and align said body and frame with said wheels of said landing gear.

10. A motor vehicle for moving an airplane on the ground including: a vehicle body; steerable wheels on one end of said body rotatable about a horizontal axis; a frame; means mounting said frame on the other end of said body for relative movement of the frame and body about a vertical axis; driving wheels carried by said frame; driving means on said body; a flexible drive connection between said driving wheels and said driving means; coupling means on said frame for coupling the frame to the landing gear of an aircraft; means on said frame operable when said coupling means couples said frame to said landing gear for moving said driving wheels off the ground; said body and frame pivoting about the horizontal axis of said steerable wheels upon said movement of said driving wheels off the ground; crowding means connected with said frame and said coupling means operable to urge said driving wheels into frictional driving engagement with wheels of said landing gear; said landing gear wheels upon the turning of the airplane to the right or left applying to said driving wheels a force for moving said frame about said vertical axis; power-operated steering means on said body connected with said steerable wheels; sensing means operatively connected with said frame and said power-operated steering means operable in response to relative movement of said frame and said body about said vertical axis to actuate said steering means to move said steerable wheels to align said body and frame with said wheels of said landing gear; means for disconnecting said coupling means from said landing gear; and means for restoring said driving wheels into engagement with the ground.

11. In a motor vehicle for moving an airplane on the ground: a vehicle body; steerable wheels supporting one end of the body; a driving unit including driving wheels for supporting the other end of said body; means mounting said unit on the other end of said body and providing for relative movement of said body and said unit; means on said unit for effecting a draft connection of the vehicle with the landing gear of an airplane; means on said unit operable after said draft connection is effected for elevating said driving wheels from the ground; means on said unit for moving said elevated wheels into frictional driving engagement with wheels of said landing gear; means for driving said driving wheels; said mounting means permitting said unit to move relative to said body in response to turning of the airplane to the right or the left; and steering means on said body operatively connected with said unit operable to steer said steerable wheels in response to said relative movement of said body and said unit.

12. In a motor vehicle for moving an airplane on the ground: a vehicle body; steerable wheels supporting one end of said body; steering means for said wheels; driving wheels for supporting the other end of said body; a frame; means mounting said frame on said other end of said body for movement relative to said body about a vertical axis; an axle on said frame supporting said driving wheels; a source of power on said body; driving means connecting said source with said axle for driving said wheels; means on said frame operable to elevate said driving wheels from the ground and maintain them in frictional driving engagement with wheels of the landing gear of an airplane; and means on said body connected with said steering means and said frame for operating said steering means to steer said steerable wheels in a predetermined direction according to said relative movement of said body and said frame.

13. In a motor vehicle for moving an airplane on the ground: a vehicle body; steerable wheels supporting one end of said body; steering means for said wheels; driving wheels for supporting the other end of said body; a frame; means mounting said frame on said other end of said body for movement relative to said body about a vertical axis; an axle on said frame supporting said driving wheels; a source of power on said body; driving means connecting said source with said axle for driving said driving wheels; means for connecting said frame with the landing gear of an airplane; means on said frame operable after connection of the frame with said landing gear for elevating said frame and said driving wheels; power-operated means on said frame for crowding said driving wheels against wheels of the landing gear for driving the latter; and actuating means for said steering means operable in response to relative movement of said body and frame for operating said steering means to steer said steerable wheels.

14. In a motor vehicle for moving an aircraft on the ground: a vehicle body; two sets of wheels supporting said body; means mounting one set of said wheels on said body for movement relative to said body about a vertical axis; coupling means for effecting a draft connection of said one set with the landing gear of an airplane; means operable when said coupling means has effected said draft connection for elevating said one set off the ground; means cooperable with said coupling means for moving said one set into frictional driving engagement with wheels of said landing gear; means for driving said one set; and means connected with said body, said one set and the other set of said wheels operable to steer said other set in response to movement of said one set relative to said body about said axis while said one set drives said landing gear wheels.

15. In a motor vehicle for moving an airplane on the ground: a vehicle body; at least two sets of wheels supporting said body; means for driving one of said sets of wheels; means mounting said one set on one end of said body for movement relative to said body about a vertical axis; coupling means connected with said one set operable for effecting a draft connection of the motor vehicle with the landing gear of an airplane; the other set of wheels providing a horizontal axis about which said body is movable for raising and lowering said one end of said body; means operable when said coupling means has effected said draft connection for raising said one end of said body and said one set of wheels to lift the latter from the ground; means operatively connected with said one set for crowding the wheels thereof into frictional driving engagement with the wheels of said landing gear; steering means for said other set; and sensing means connected with said one set, said body and said steering means operable in response to relative movement of said one set and said body about said vertical axis for operating said steering means to steer said other set.

16. A motor vehicle for moving an airplane on the ground comprising: a vehicle body; steerable wheels on said body; a frame; king pin means connecting said frame with said body for movement about a vertical axis; an axle on said body; driving wheels on said axle; power means on said body; driving means connecting said power means with said axle for driving said driving wheels; coupling means for connection with landing gear of an airplane; power-operated crowding means supporting said coupling means and mounted on said axle for movement to raise and lower said coupling means as well as for moving said coupling means toward and away from said landing gear; power-operated positioning means on said frame operable while said coupling means is coupled to said landing gear to elevate said frame and dispose said driving wheels above the ground; said crowding means being operable to move said elevated wheels into driving engagement with wheels of said landing gear; power-operated steering means for said steerable wheels; valve means on said body for controlling said steering means; an arm projecting from said frame rearwardly of said king pin means; and linking means connecting said arm with said valve means for operating the latter to cause operation of said steering means for aligning said body with said frame when said frame turns about said king pin means in response to the turning of the airplane to the right or left while driven by said driving wheels.

17. A motor vehicle for moving an airplane on the ground including: a vehicle body; steerable wheels on said body; driving wheels; means mounting said driving wheels on said body for translatory movement thereon; means for effecting a draft connection of said body with landing gear of an airplane; means for moving said driving wheels into frictional driving engagement with wheels of said landing gear; means for driving said driving wheels; and steering means including means connecting said steerable wheels with said driving wheels operable while said landing gear wheels are driven by said driving wheels and responsive to translatory movements of said driving wheels on said body for steering said steerable wheels in response to turning movements of the airplane.

18. A motor vehicle for moving an airplane on the ground including: a vehicle body; steerable wheels on said body; driving wheels; means mounting said driving wheels on said body; means for effecting a draft connection of said body with landing gear of an airplane; means operable after said draft connection is effected for moving said driving wheels into frictional driving engagement with wheels of said landing gear; means for driving said driving wheels; power-operated steering means for said steerable wheels; valve means on said body for effecting and controlling operation of said steering means; and means operatively connected with said mounting means for said driving wheels and with said valve means operable to actuate said valve means for effecting and controlling operation of said steering means incident to the turning of the airplane while driven by said driving wheels.

19. In a motor vehicle having coupling means for connection with landing gear of an airplane, power-operated driving means for transmitting a driving force to wheels of said landing gear for moving the airplane along the ground while the motor vehicle is connected with said landing gear, steerable wheels, and steering means for said wheels: that improvement which includes means supporting said power-operated driving means on said vehicle for translatory movement relative to the vehicle while transmitting a driving force to said wheels of said landing gear; and means connecting said power-operated driving means with said steering means operable in response to said relative translatory movement for operating said steering means to steer said steerable means.

20. In a motor vehicle having coupling means for connection with landing gear of an airplane, power-operated driving means for transmitting a driving force to wheels of said landing gear for moving the airplane along the ground while the motor vehicle is connected with said landing gear, steerable wheels, and steering means for said wheels: that improvement which includes means supporting said power-operated driving means for pivotal movement in response to turning of the airplane; and means connecting said power-operated driving means with said steering means for operating said steering means to turn said steerable wheels in a direction opposite the direction in which said airplane is turned.

21. In a motor vehicle having coupling means for connection with landing gear of an airplane, power-operated driving means for transmitting a driving force to wheels of said landing gear for moving the airplane along the ground while the motor vehicle is connected with said landing gear, steerable wheels, and power-operated steering means for said steerable wheels: that improvement wherein said power-operated driving means includes a frame and means mounting said frame for movement about a vertical axis in response to turning movement of the airplane; a member projecting from and movable with said frame; a lever fulcrumed on said member; valve means movable into and from a position for operating said power-operated steering means; means operatively connecting said lever with said valve means for moving said valve means into a position for operating said steering means for steering said steerable wheels in response to movement of said frame about said axis and consequent movement of said lever; and means connecting said lever with said member for yieldably holding said lever in a neutral position in which said valve means is inoperable to cause said steering operation until said frame moves about said axis.

22. In a motor vehicle having coupling means for connection with landing gear of an airplane, power-operated driving means for transmitting a driving force to wheels of said landing gear for moving the airplane along the ground while the motor vehicle is connected with said landing gear, steerable wheels, and power-operated steering means for said steerable wheels: that improvement wherein said power-operated driving means includes a frame and means mounting said frame for movement about a vertical axis in response to turning movement of the airplane; a member projecting from and movable with said frame; a lever fulcrumed on said member; valve means movable into and from a position for operating said power-operated steering means; means operatively connecting said lever with said valve means for moving said valve means into positions for operating said steering means to steer said steerable wheels in response to movement of said frame about said axis and consequent movement of said lever; means connecting said lever with said member for yieldably holding said lever in a neutral position in which said valve means is inoperable to cause said steering operation; and dash pot means connected with said lever and said member for delaying movement of said lever from said neutral position into one of said valve operating positions until said frame moves about said axis a predetermined extent.

23. A motor vehicle for supplying power for moving an aircraft on the ground including: a vehicle body; steering means on said body; means for coupling the vehicle with an airplane for movement therewith on the ground; means including a power source on said body for driving wheels of the landing gear of the airplane to propel the airplane on the ground; means mounting said driving means for movement about an axis in response to turning movement of the airplane while the airplane is being driven by said driving means; means yieldably restraining movement of said mounting means about said axis; and means operable in response to movement of said driving means about said axis for operating said steering means.

24. A motor vehicle for supplying power for moving an airplane on the ground including: a vehicle body; a structure pivoted to said body to swing relative thereto; means connected with said pivoted structure for coupling the vehicle to an airplane for movement therewith on the ground; driving means on said pivoted structure operable while the vehicle is coupled to the airplane for driving wheel means of the landing gear of the airplane to propel the airplane on the ground; means for driving said driving means; said pivoted structure being disposed to swing relative to said body in response to turning movements of the airplane while said driving means drives said wheel means of the landing gear; and means operable in response to said swinging movement of said pivoted structure to align the vehicle with said wheel means.

25. A motor vehicle for supplying power for moving an airplane on the ground including: a vehicle body; a structure pivoted to said body to swing relative thereto; means connected with said pivoted structure for coupling the vehicle to an airplane for movement therewith on the ground; driving means on said pivoted structure operable while the vehicle is coupled to the airplane for driving wheel means of the landing gear of the airplane to propel the airplane on the ground; means for driving said driving means; said pivoted structure being disposed to swing relative to said body in response to turning movements of the airplane while said driving means drives said wheel means of the landing gear; means yieldably resisting said swinging movement of said pivoted structure; and means operable in response to said swinging movement of said pivoted structure to align the vehicle with said wheel means.

References Cited in the file of this patent

UNITED STATES PATENTS

| | | |
|---|---|---|
| 1,330,289 | Thurmond | Feb. 10, 1920 |
| 2,124,947 | Henderson | July 26, 1938 |
| 2,409,552 | Donnellan | Oct. 15, 1946 |